No. 737,559. PATENTED AUG. 25, 1903.
C. MILLER.
TIRE.
APPLICATION FILED NOV. 29, 1902.
NO MODEL. 2 SHEETS—SHEET 1.
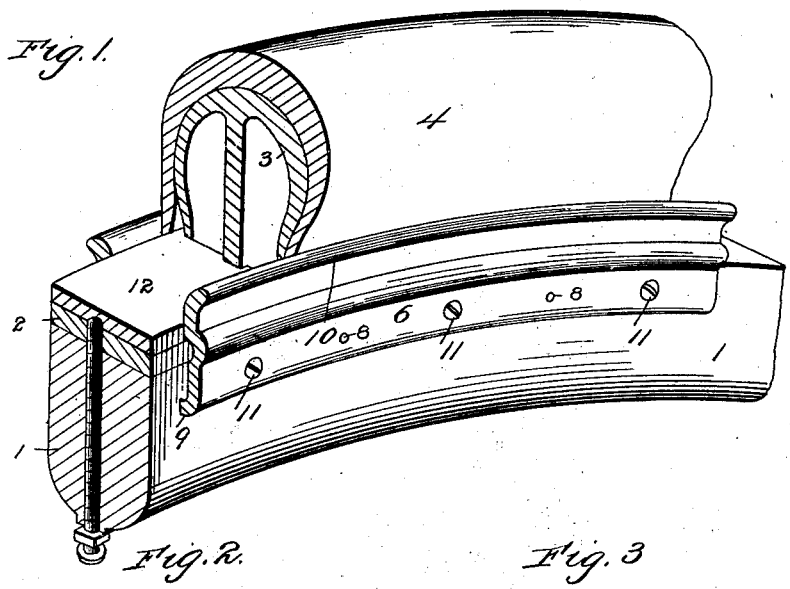
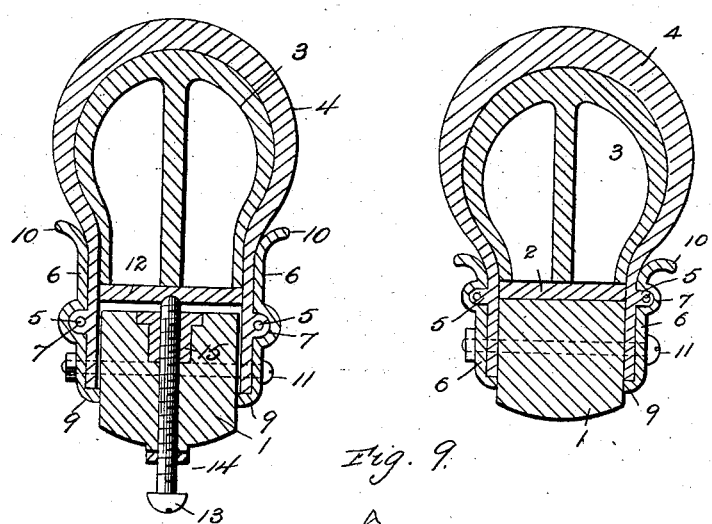
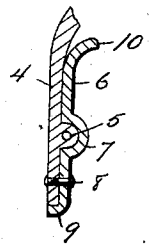
WITNESSES
INVENTOR
Charles Miller
Attorneys No. 737,559. PATENTED AUG. 25, 1903.
C. MILLER.
TIRE.
APPLICATION FILED NOV. 29, 1902.
NO MODEL. 2 SHEETS—SHEET 2.
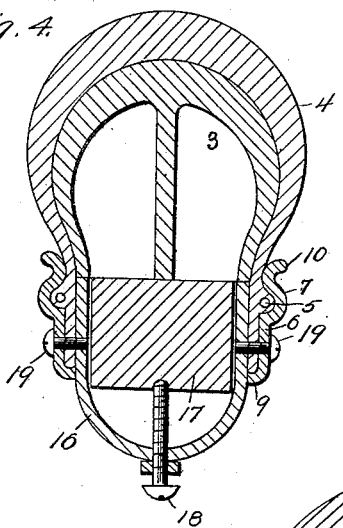
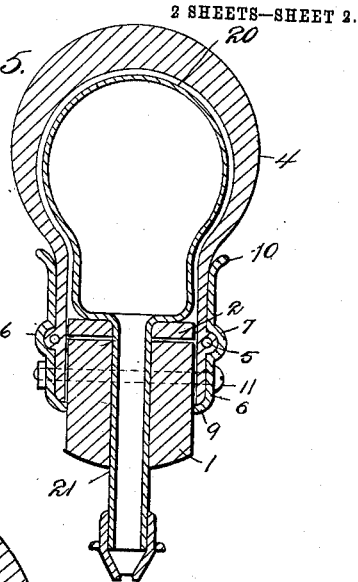
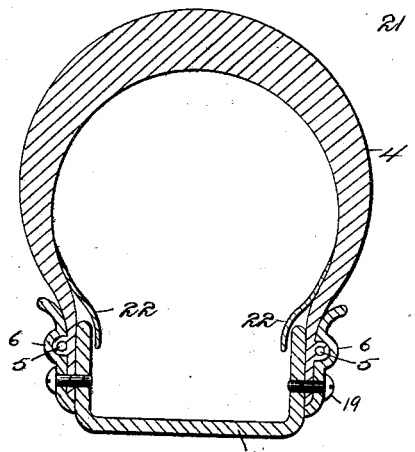
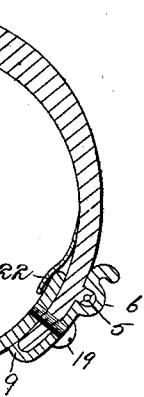
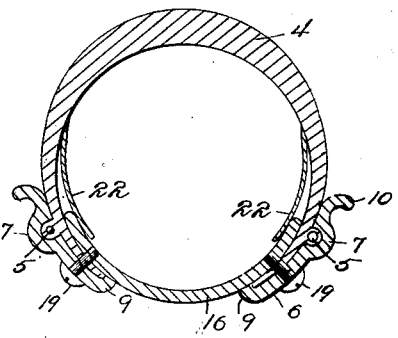
WITNESSES
INVENTOR
Attorneys No. 737,559. Patented August 25, 1903.

UNITED STATES PATENT OFFICE.

CHARLES MILLER, OF BINGHAMTON, NEW YORK.

TIRE.

SPECIFICATION forming part of Letters Patent No. 737,559, dated August 25, 1903.

Application filed November 29, 1902. Serial No. 133,187. (No model.)

*To all whom it may concern:*

Be it known that I, CHARLES MILLER, a citizen of the United States, residing at Binghamton, in the county of Broome and State of New York, have invented certain new and useful Improvements in Tires, of which the following is a specification.

This invention relates to tires, and has for its object to provide an improved form of protective non-puncturable shoe or casing for cushion and pneumatic tires, and is particularly designed to provide for convenience in securing the opposite edges of the casing to a rim or felly and to insure a strong and durable connection therefor independent of the pressure of the tire proper, especially a pneumatic tire. It is furthermore designed to have the improvements applicable to solid wooden fellies and to metallic rims of different shapes without altering the device in any manner whatsoever.

Another object is to provide for quickly and conveniently adjusting a cushion-tire into snug engagement with the casing in order that the latter may be conveniently fitted in place in a comparatively loose condition about the tire proper and then stretched taut by having the tire forced outwardly into snug engagement therewith.

In the drawings, Figure 1 is a sectional perspective view of an ordinary wooden rim having a tire constructed and arranged in accordance with my present invention. Fig. 2 is a sectional view with the usual metallic tire omitted. Fig. 3 is a similar view with the tension-screws omitted. Fig. 4 is a cross-sectional view of the invention applied to a U-shaped metallic rim. Fig. 5 is a sectional view of an ordinary wooden rim having a pneumatic tire secured thereto by means of the present invention. Figs. 6, 7, and 8 are sectional views showing the invention applied to metallic rims of different shapes.

Like characters of reference designate corresponding parts in all the figures of the drawings.

Referring at first more particularly to Fig. 1, the reference character 1 designates an ordinary wooden rim having the usual flat metallic tire 2. Upon the metallic tire is fitted a cushion-tire 3 of any preferred type, the tire shown in the drawings being constructed according to my prior patent, No. 710,595, dated October 7, 1902. A protective casing or shoe 4, of rubber, canvas, leather, or the like, snugly embraces the cushion-tire, with its opposite edges overlapping the rim or felly and provided with external peripheral beads or ribs 5. To each edge portion of the casing or shoe is secured a metallic plate or flange 6 in the form of a ring or band to extend entirely around the wheel. Each plate or flange is provided upon its inner face with an intermediate longitudinal groove or seat 7 for the snug reception of the adjacent bead or rib 5, and rivets 8 pierce the plate and the adjacent edge portion of the casing between the groove and the inner edge of the plate, so as to firmly and durably connect the plate or flange and the casing. The inner edge of the plate is provided with a laterally-projected peripheral flange or shoulder 9, which fits snugly against the inner edge of the casing with its inner edge bearing against the rim. The outer peripheral edge of the plate is bowed, flared, or rounded outwardly, as at 10, to prevent cutting of the casing when the cushion-tire is laterally distended by weight thereon. At regular intervals between the members of the series of rivets bolts 11 are set through the rim, the opposite edges of the casing, and the two plates, thereby securing the shoe or casing to the rim in a strong, durable, and exceedingly simple manner without requiring any alteration in the rim beyond forming the perforations for the bolts. In order that the shoe or casing may snugly fit the cushion-tire, it has been designed to arrange for forcing the tire into snug engagement with the casing after the latter has been secured to the rim. To accomplish this result, a follower-plate 12 has been loosely interposed between the metallic tire and the cushion-tire, said plate being formed of independent sections. Through the back of the rim are set tension-screws 13, which pass through screw-threaded openings in the tire with their ends frictionally engaging the respective follower-plates, so that by adjusting the screws the plates may be forced outwardly or upwardly against the cushion-tire and the latter forced outwardly or upwardly into snug engagement with the shoe or casing. The exposed ends of the tension-screws may be provided with screw-driver grooves or may have wings or finger-pieces for convenience in adjusting the same. Suitable jam-nuts 14 are fitted to the projected exposed ends of the screws to lock the same after being adjusted.

In some instances, as in the original manufacture of a wheel, the metallic tire may be omitted and, as shown in Fig. 2, a nut or screw-threaded seat or socket 15 is let in flush with the outer face of the rim for the reception of the adjacent tension-screw. It will here be noted that the nuts 15 and the tire form seats for the tension-screws.

If desired, the tension-screws may be omitted entirely, as shown in Fig. 3 of the drawings, in which event care must be taken that the shoe or casing is drawn snugly about the tire when it is being secured to the rim.

Fig. 4 of the drawings shows the improvements applied to a U-shaped metallic rim 16, with a wooden follower 17 slidably fitted between the straight opposite side walls of the rim and a tension-screw 18, set through the back of the rim and against the follower. With a hollow rim of this character separate screw-threaded fastenings 19 are employed for securing each plate 6 to the respective sides of the rim, so as to permit of an unobstructed adjustment of the follower.

To show that the present improvements are applicable to pneumatic as well as cushion tires, reference is had to Fig. 5, wherein 20 indicates an ordinary pneumatic tire having the stem 21 of its inflation-valve projected through an opening in the rim in the ordinary manner, with the casing or shoe fitted to the tire and rim and secured to the latter in the same manner as shown and described for Fig. 1. With a pneumatic tire the tension-screws are of course unnecessary, as the tire may be inflated sufficiently to snugly fit the shoe or casing.

Although the metallic tire 2 has been shown in Fig. 5 to indicate that it is not absolutely necessary to remove the same, it will of course be understood that it may be omitted, if desired.

In Figs. 6, 7, and 8 have been shown different shapes of metallic rims for pneumatic tires, the latter being omitted and the casing or shoe having its opposite edges individually connected to the respective sides of the rim, as described for Fig. 4. The shoe or casing for this type of rim is provided at opposite sides with inner peripheral flaps 22, with their outer edges secured to the inner walls of the casing and their inner edges free, so as to overlap the inner faces of the opposite sides of the dished rims to protect the pneumatic inner tube from being cut by the edges of the rim.

From the foregoing description it is apparent that the present invention besides providing a protective casing for tires also provides for connecting the same to the rim without the use of cement in a manner to effectually prevent creeping and consequent looseness of the tire. Moreover, it affords a positive fastening for the tire, as it does not depend upon the pressure of the air, as in the clench type of tires.

It will of course be understood that changes in the form, proportion, and minor details may be made within the scope of the claims, and therefore I do not wish to be understood as limiting myself to the precise details of construction and arrangement as hereinbefore described, and shown in the drawings.

I claim—

1. The combination with a rim, of a yieldable tire thereon, a shoe or casing embracing the tire, opposite rigid bands or plates embracing the respective edge portions of the shoe between said bands and the rim, fastenings securing the bands to the shoe, and other fastenings connecting the bands to the rim.

2. The combination with a rim, of a yieldable tire thereon, a shoe or casing embracing the tire and overlapping the rim, opposite rigid bands or plates riveted to the respective edge portion of the shoe and overlapping the rim, and removable fastenings securing the bands to the rim.

3. The combination with a rim, of a yieldable tire thereon, a shoe or casing embracing the tire and overlapping the rim, the opposite edge portions of the shoe having external annular beads or ribs, opposite rigid bands lying against the respective edge portions of the shoe and provided with intermediate annular grooves receiving the ribs, the inner edges of the bands being projected beyond the edges of the shoe and provided with lateral annular flanges engaging the rim, the outer peripheral edges of the bands being projected beyond the outer face of the rim and bowed or turned outwardly from the shoe, fastenings securing the bands to the shoe, and other fastenings securing the bands to the rim and located between the ribs of the shoe or casing and the inner peripheral edge of the bands.

4. The combination with a rim, of a yieldable tire thereon, a shoe or casing embracing the tire and secured to the rim, and manually-adjustable means carried by the rim for forcing the tire outwardly into snug engagement with the shoe.

5. The combination with a rim, of a yieldable tire thereon, of a shoe or casing embracing the tire and connected to the rim, and means piercing the rim and accessible at the back thereof for forcing the tire outwardly into snug engagement with the shoe.

6. The combination with a rim, of a yieldable tire thereon, a shoe or casing embracing the tire and connected to the rim, and set-screws piercing the rim and engaging the back of the tire to force the same outwardly into snug engagement with the shoe.

7. The combination with a rim, of a yieldable tire thereon, a loose sectional band of metal interposed between the rim and the tire, a shoe or casing embracing the tire and connected to the rim, and set-screws piercing the rim and engaging the respective band-sections to force the tire outwardly into snug engagement with the shoe.

8. The combination with a rim, of a yieldable tire thereon, a shoe or casing embracing the tire and overlapping the rim, opposite rigid bands embracing the edge portions of the shoe between said bands and the rim and also connected to the shoe and the rim, and set-screws piercing the rim to force the tire outwardly into snug engagement with the shoe.

9. A shoe for tires, comprising a flexible band member which is substantially U-shaped in cross-section, and is provided with external annular ribs at opposite sides and remote from the respective edges of the shoe, rigid band members applied to opposite sides of the shoe and having intermediate annular grooves receiving the respective ribs of the shoe, and rivets piercing the rigid bands and the respective side portions of the flexible band between the grooves and the inner peripheral edges thereof.

10. The combination with a channeled rim, of a radially-adjustable member fitted in the rim, a tire fitted against the said adjustable member, a shoe embracing the tire and connected to the rim, and means piercing the back of the rim and engaging the adjustable member for forcing the same outwardly.

In testimony whereof I affix my signature in presence of two witnesses.

CHARLES MILLER.

Witnesses:
ORLANDO P. BRADLEY,
I. C. GANOW.